(12) United States Patent
Sullivan

(10) Patent No.: US 10,747,005 B1
(45) Date of Patent: Aug. 18, 2020

(54) APPARATUS, SYSTEM, AND METHOD FOR ADJUSTING HEAD-MOUNTED-DISPLAY STRAPS

(71) Applicant: FACEBOOK TECHNOLOGIES, LLC, Menlo Park, CA (US)

(72) Inventor: Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 68 days.

(21) Appl. No.: 15/615,775

(22) Filed: Jun. 6, 2017

(51) Int. Cl.
*G02B 27/01* (2006.01)

(52) U.S. Cl.
CPC ..... *G02B 27/0176* (2013.01); *G02B 27/0149* (2013.01); *G02B 2027/0154* (2013.01); *G02B 2027/0169* (2013.01)

(58) Field of Classification Search
CPC .................. G02B 27/0176; G02B 27/0149
See application file for complete search history.

(56) References Cited

U.S. PATENT DOCUMENTS

| | | | | |
|---|---|---|---|---|
| 3,992,720 A | * | 11/1976 | Nicolinas | A42B 3/145 2/418 |
| 4,198,114 A | * | 4/1980 | Zapp | G02B 27/0172 359/376 |
| 4,783,822 A | * | 11/1988 | Toole | H04M 1/05 2/209 |
| 5,276,471 A | * | 1/1994 | Yamauchi | G02B 27/0176 345/8 |
| 5,321,416 A | * | 6/1994 | Bassett | A42B 3/145 345/8 |
| 5,406,037 A | * | 4/1995 | Nageno | H04R 5/0335 181/129 |

(Continued)

FOREIGN PATENT DOCUMENTS

| CN | 206863348 U | * | 1/2018 |
|---|---|---|---|
| CN | 109239927 A | * | 1/2019 |

OTHER PUBLICATIONS

Peter Wesley Bristol et al.; Apparatus, System, and Method for Adjusting Head-Mounted-Display Straps; U.S. Appl. No. 15/582,566, filed Apr. 28, 2017.

(Continued)

*Primary Examiner* — Nitin Patel
*Assistant Examiner* — Robert M Stone
(74) *Attorney, Agent, or Firm* — FisherBroyles, LLP

(57) ABSTRACT

A head-mounted-display adjustment apparatus may include a strap that includes (1) a proximal section coupled to a proximal area of a head-mounted display and (2) a distal section coupled to a distal area of the head-mounted display in a manner that holds the head-mounted display, when being worn by a user, against the user's face. The apparatus may also include a spring that couples the proximal section of the strap to the proximal area of the head-mounted display. In addition, the apparatus may include an adjustment mechanism connected to the spring such that (1) actuation of the adjustment mechanism adjusts the spring and (2) adjusting the spring changes an amount of force that the head-mounted display, when being worn by the user, applies to the user's face. Various other head-mounted-display adjustment devices, systems, and methods are also disclosed.

20 Claims, 13 Drawing Sheets

(56) References Cited

U.S. PATENT DOCUMENTS

| | | | | |
|---|---|---|---|---|
| 5,486,841 | A * | 1/1996 | Hara | G02B 7/12 345/8 |
| 5,774,096 | A * | 6/1998 | Usuki | G02B 7/12 340/980 |
| 6,425,142 | B2 * | 7/2002 | Sasaki | A42B 3/085 2/417 |
| 6,708,376 | B1 * | 3/2004 | Landry | A42B 3/145 2/418 |
| 9,572,392 | B2 * | 2/2017 | Klotz | A42B 3/145 |
| 10,408,313 | B1 * | 9/2019 | Sullivan | F16H 19/06 |
| 2002/0008677 | A1 * | 1/2002 | Saito | G02B 27/0176 345/8 |
| 2003/0051732 | A1 * | 3/2003 | Smith | A61M 16/06 128/206.27 |
| 2006/0007562 | A1 * | 1/2006 | Willey | A42B 3/042 359/811 |
| 2006/0070168 | A1 * | 4/2006 | Nakabayashi | G02B 27/0176 2/171 |
| 2006/0225187 | A1 * | 10/2006 | Wu | A42B 3/145 2/425 |
| 2009/0066607 | A1 * | 3/2009 | Yasuda | G02B 27/0176 345/8 |
| 2010/0296683 | A1 * | 11/2010 | Slippy | H04R 5/0335 381/377 |
| 2011/0127305 | A1 * | 6/2011 | Yates | G02B 7/002 224/181 |
| 2011/0273365 | A1 * | 11/2011 | West | G02B 27/0176 345/8 |
| 2013/0312163 | A1 * | 11/2013 | Van Waes | A42B 3/145 2/421 |
| 2016/0074649 | A1 * | 3/2016 | Williams | A61N 1/0484 600/587 |
| 2016/0299346 | A1 | 10/2016 | Allin et al. | |
| 2016/0363768 | A1 | 12/2016 | Drinkwater et al. | |
| 2016/0363772 | A1 * | 12/2016 | Miller | H05K 999/99 |
| 2016/0363773 | A1 * | 12/2016 | Tempel | G02B 27/0176 |
| 2016/0363996 | A1 | 12/2016 | Higgins et al. | |
| 2016/0366503 | A1 | 12/2016 | Miller et al. | |
| 2019/0072772 | A1 * | 3/2019 | Poore | G02B 27/0176 |

OTHER PUBLICATIONS

Glen Jason Tompkins et al.; Apparatus System and Method for Adjusting Head-Mounted-Display Straps; U.S. Appl. No. 15/586,270, filed May 4, 2017.

Glen Jason Tompkins et al.; Apparatus, System, and Method for Adjusting Head-Mounted-Display Straps; U.S. Appl. No. 15/600,348, filed May 19, 2017.

* cited by examiner

APPARATUS, SYSTEM, AND METHOD FOR ADJUSTING HEAD-MOUNTED-DISPLAY STRAPS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Since many headsets may be relatively heavy with most of their weight distributed toward the front, a poor fit may result in significant pressure on a user's face, leading to discomfort that may make a virtual reality experience less compelling.

Traditional virtual reality headsets may provide some limited options for addressing a poor fit, but these options may be sub-optimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using virtual reality headsets—the configuration of some traditional headset straps may result in awkward, uncomfortable, or comical attempts at putting on or removing headsets.

SUMMARY

As will be described in greater detail below, the instant disclosure generally relates to head-mounted-display strap devices systems, and methods. In some embodiments, a head-mounted-display adjustment apparatus may include a strap that includes (1) a proximal section coupled to a proximal area of a head-mounted display and (2) a distal section coupled to a distal area of the head-mounted display in a manner that holds the head-mounted display, when being worn by a user, against the user's face. The apparatus may also include a spring that couples the proximal section of the strap to the proximal area of the head-mounted display. In addition, the apparatus may include an adjustment mechanism connected to the spring such that (1) actuation of the adjustment mechanism adjusts the spring and (2) adjusting the spring changes an amount of force that the head-mounted display, when being worn by the user, applies to the user's face.

In some embodiments, the adjustment mechanism may include a shaft coupled to the spring such that rotation of the shaft adjusts the spring. Rotation of the shaft may be produced by rotation of a gear that is attached to the shaft. This gear may be a driven gear that is meshed with a drive gear such that rotation of the drive gear turns the driven gear. For example, the driven and drive gears may have intersecting axes of rotation. In one embodiment, the drive gear may have a rotatable outer dial grip and may be dimensioned to be rotated by the user of the head-mounted display. In addition, the drive gear may be located within a housing that couples the spring to the head-mounted display. In some examples, the housing of the spring may also hold the driven gear and may be fixed to a base upon which the drive gear rotates. Furthermore, the driven and drive gears may be mating bevel gears and may have conical tooth-bearing faces with adjacent pitch cones.

The housing that couples the spring to the proximal area of the head-mounted display may be configured for right-handed use. In some examples, the apparatus may include an additional housing that couples an additional spring to the distal area of the head-mounted display in a mirror image of the housing that couples the spring to the proximal area such that the additional housing is configured for left-handed use. In one embodiment, driven and drive gears within the housing that is configured for right-handed use may have teeth cut with both right-handed and left-handed threads. In this embodiment, these gears may be identical to driven and drive gears within the additional housing configured for left-handed use.

In some examples, the spring may be a constant force spring. In these examples, the spring may have an outside portion coupled to the strap and an inside portion coupled to the shaft.

In some embodiments, the apparatus may also include a base track that is coupled to the head-mounted display and is positioned inside a movable slide. In examples where the spring is a constant force spring, the outside portion of the constant force spring may be attached to the movable slide. For example, the constant force spring may be a ribbon that has a rolled portion and a protracted section that extends from the rolled portion. This protracted section may be anchored to the movable slide. In this example, rotation of a driven gear coupled to the rolled portion of the spring (e.g., via a shaft) may roll or unroll the ribbon to adjust the spring.

According to various embodiments, a corresponding head-mounted-display system may include a head-mounted display and a strap that includes (1) a proximal section coupled to a proximal area of the head-mounted display and (2) a distal section coupled to a distal area of the head-mounted display in a manner that holds the head-mounted display, when being worn by a user, against the user's face. In addition, the system may include a spring that couples the proximal section of the strap to the proximal area of the head-mounted display. The system may also include an adjustment mechanism connected to the spring such that (1) actuation of the adjustment mechanism adjusts the spring and (2) adjusting the spring changes an amount of force that the head-mounted display, when being worn by the user, applies to the user's face.

In some examples, actuation of the adjustment mechanism may cause the spring to roll or unroll. In these examples, rolling the spring may increase the amount of force that the head-mounted display applies to the user's face. Conversely, unrolling the spring may decrease the amount of force that the head-mounted display applies to the user's face.

In some embodiments, the system may include a drive gear that is coupled to the head-mounted display and is dimensioned to be rotated by the user of the head-mounted display. The system may also include a driven gear meshed with the drive gear such that rotation of the drive gear turns the driven gear. In one embodiment, the driven gear may be attached to a shaft that is coupled to the spring. In this embodiment, rotation of the driven gear may induce rotation of the shaft, which may in turn adjust the spring.

In some examples, the spring may be a constant force spring. This spring may be a ribbon having a rolled portion and a protracted section that extends from the rolled portion. In one embodiment, the rolled portion may be attached to a base track that is located inside a movable slide. This base track may be attached to the head-mounted display. In addition, the protracted section of the constant force spring may be anchored to the movable slide. Extending the rolled portion of the spring (e.g., unrolling the spring) may cause the movable slide to extend along the base track and the strap to extend away from the head-mounted display. Conversely, retracting the rolled portion of the spring may cause the movable slide to retract along the base track and the strap to retract toward the head-mounted display.

In some embodiments, the system may include a housing that couples the spring to the proximal area of the head-mounted display. In one embodiment, this housing may be configured for right-handed use. The system may also include an additional housing that couples an additional spring to the distal area of the head-mounted display and is configured for left-handed use.

In addition to the various systems and devices described herein, the instant disclosure presents exemplary methods associated with head-mounted-display strap systems. For example, a method may include coupling, via a spring, a proximal section of a strap to a proximal area of a head-mounted display. The method may also include coupling a distal section of the strap to a distal area of the head-mounted display in a manner that holds the head-mounted display, when being worn by a user, against the user's face. In addition, the method may include connecting an adjustment mechanism to the spring such that (1) actuation of the adjustment mechanism adjusts the spring and (2) adjusting the spring changes an amount of force that the head-mounted display, when being worn by the user, applies to the user's face.

In some examples, connecting the adjustment mechanism to the spring may include coupling the spring to a shaft such that rotation of the shaft adjusts the spring.

In some embodiments, the method may also include positioning the spring within a housing that couples the spring to the head-mounted display. This housing may include a drive gear dimensioned to be rotated by the user of the head-mounted display. In examples where the spring is coupled to a shaft, the method may include coupling a coiled section of the spring to the shaft and an extended section of the spring to the strap. The method may also include (1) meshing the drive gear with a driven gear such that rotation of the drive gear turns the driven gear and (2) coupling the shaft with the driven gear such that rotation of the driven gear rotates the shaft.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate examples of apparatuses, systems, and methods according to various embodiments described herein. These drawings are a part of the specification and, together with the following description, demonstrate and explain various principles of the instant disclosure. Throughout the drawings, identical reference characters and descriptions indicate similar, but not necessarily identical, elements.

Figure 1:
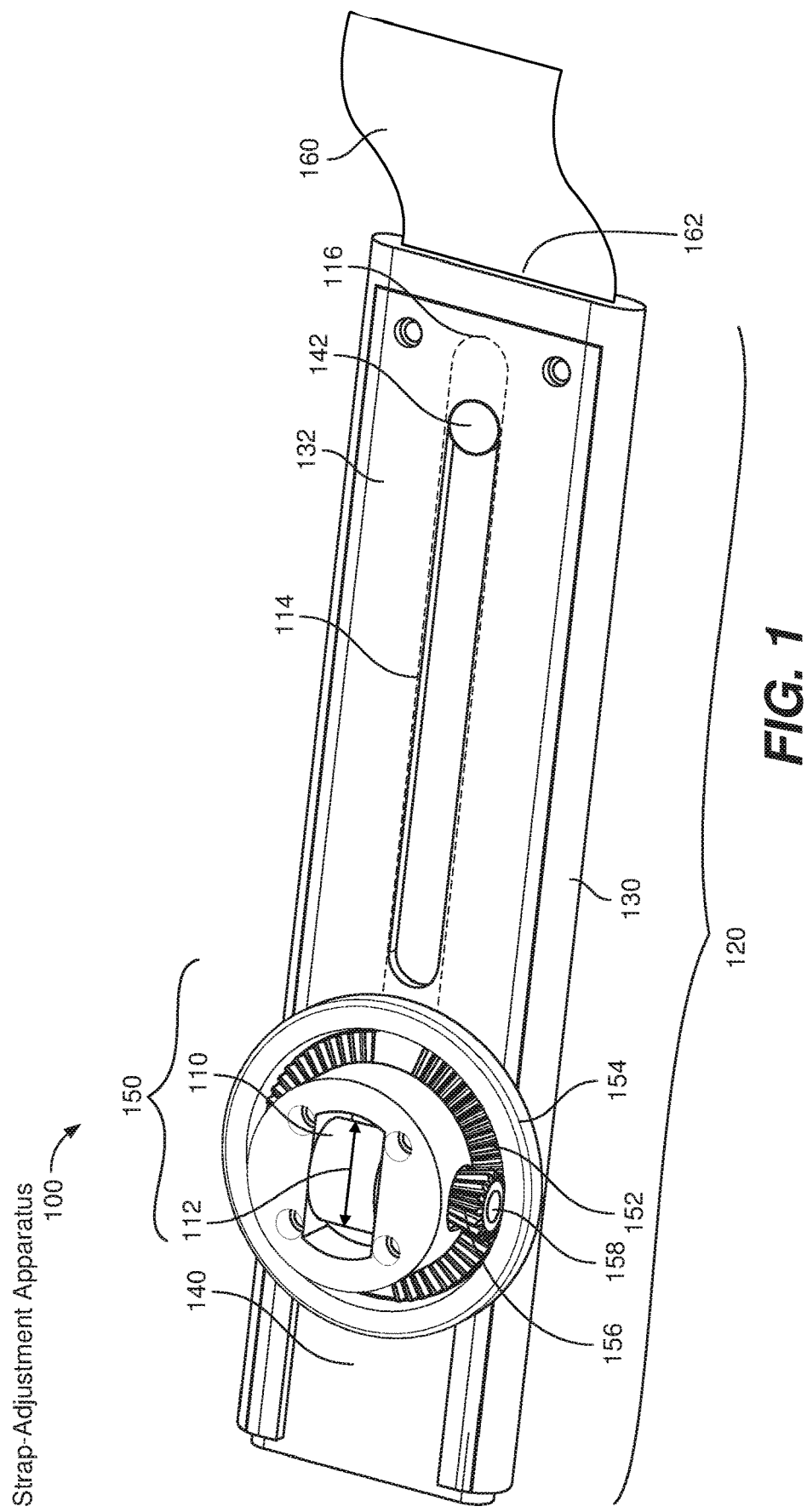
FIG. 1 is a perspective view of a strap-adjustment apparatus coupled to a strap of a head-mounted display.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary spring mechanisms for adjusting head-mounted-display straps. These spring mechanisms may be extensibly connected to a head-mounted display and coupled to a strap that holds the head-mounted display against a user's head. The disclosed spring systems may incorporate an adjustment mechanism that enables a user to make micro adjustments to a spring that pulls a head-mounted display against the user's face. For example, the adjustment mechanism may include a graspable dial that, when rotated by the user, adjusts displacement and/or tension of a spring, thereby tightening or loosening a strap mechanism. By implementing such an adjustment mechanism within a strap-adjustment system of a head-mounted display the disclosed systems may enable users with various head sizes to easily and comfortably make fine-tuned adjustments to the fit of a head-mounted display.

The spring systems disclosed herein may also provide various features and advantages over conventional strap systems by using a constant-force spring made from a ribbon of rolled material. The disclosed adjustment mechanisms may be attached to an inside end of the ribbon and may adjust the constant-force spring by rolling or unrolling the ribbon. In some embodiments, a strap-adjustment mechanism that is loaded with a constant-force spring may enable smoother and easier adjustments than a strap mechanism loaded with other types of springs. Accordingly, these and other disclosed embodiments, whether used alone or in combination, may help optimize the immersiveness, enjoyability, and/or utility of a virtual- or augmented-reality experience.

The following will provide, with reference to FIGS. 1 and 3-8, examples of devices for adjusting head-mounted-display systems. In addition, the discussion associated with FIGS. 2 and 9-11 will provide examples of head-mounted-display systems that include the devices illustrated in FIGS. 1 and 3-8. Finally, the discussion corresponding to FIGS. 12 and 13 will provide examples of methods for manufacturing, assembling, configuring, and/or using the head-mounted-display adjustment mechanisms presented herein.

FIG. 1 illustrates a strap-adjustment apparatus 100 for adjusting a head-mounted-display strap. As shown in FIG. 1, strap-adjustment apparatus 100 may include a spring 110. In one example, spring 110 may be a spring with a restoring force that is, within an elastic limit of spring 110, substantially disproportional to deflection of spring 110. The term "elastic limit," as used herein, generally refers to the maximum extent or distance that a spring may be stretched without permanent alternation. In other words, the elastic limit may be the maximum deflection of a spring in which the spring will retain its original length after force is withdrawn.

The term "deflection," as used herein, generally refers to the movement or displacement of a spring, either by applying or removing force from it. The term "restoring force," as used herein, generally refers to any force that acts to restore a spring to equilibrium or rest. Thus, the restoring force of a spring could be said to act in opposition to any displacement of the spring.

As noted, a spring whose restoring force is substantially disproportional to its deflection may be any spring that does not follow or approximately follow (i.e., within generally accepted manufacturing tolerances) Hooke's law. Hooke's law states that a deformation of an elastic object (e.g., a spring) is proportional to the stress applied to it, and traditional compression and expansion springs are examples of springs that generally obey Hooke's law.

Spring 110 may include any type or form of elastic device that does not obey Hooke's law. For example, spring 110 may be a constant-force spring that maintains uniform or near-uniform (i.e., within generally accepted manufacturing tolerances) force exertion over a range of working deflection. In other words, spring 110 may exert at least approximately constant near-constant to constant) force over a working deflection of spring 110. Alternatively, spring 110 may exert force that, while not being constant, is not generally proportional to displacement of spring 110.

Spring 110 may be configured in any fashion that causes spring 110 to function in a manner that ignores Hooke's law. For example, spring 110 may be constructed as a rolled ribbon of spring steel or any other pre-stressed material that is relaxed when fully rolled up. In other words, spring 110 may be a straight, thin-walled strip of resilient material with a curved cross-section. In these types of springs, which may be referred to as constant-force springs, tape springs, or clock springs, the restoring force may primarily be a result of an extended portion of the ribbon that is nearest to the roll. The restoring force is nearly constant in springs made from rolled ribbon because the geometry of the portion of the spring that creates the restoring force remains nearly constant as the spring unrolls.

Spring 110 may apply any amount of force that comfortably and/or securely holds a head-mounted display against a user's face. In some embodiments, spring 110 may, alone or in combination with one or more additional springs coupled to a strap 160, cause a head-mounted display to be pulled against a user's face with approximately 4-6 newtons of force. Furthermore, as discussed in greater detail below, a user may adjust spring 110 to cause a head-mounted display to apply more or less force than a default force (e.g., approximately 5 newtons) caused by spring 110.

Spring 110 may also be dimensioned in any manner that is suitable for use in the embodiments disclosed herein. For example, spring 110 may be dimensioned to enable various amounts of displacement or extension of strap 160. In some embodiments, spring 110 may enable up to approximately 80 mm of extension for strap 160. In such embodiments, spring 110 may be at least 80 mm long. In other embodiments, spring 110 may be shorter or longer than 80 mm and may enable strap 160 to extend less than 80 mm (e.g., 50, 60, or 70 mm) or more than 80 mm (e.g., 85, 90, or 95 mm). In some configurations, the longer spring 110 is, the more ability strap 160 may have to extend and accommodate different shapes and sizes of user's heads.

Spring 110 may also be any suitable width or thickness. For example, spring 110 may be less than a width of a head-mounted-display strap (e.g., less than approximately 15-50 mm). In other embodiments, spring 110 may be wider than a head-mounted-display strap but narrower than a height of a head-mounted display. Additionally or alternatively, spring 110 may have an asymmetrical cross-section with a width dimension that is greater than a thickness dimension.

Returning to strap-adjustment apparatus 100 of FIG. 1, spring 110 may be coupled to a mount 120. Mount 120 may connect spring 110 to a head-mounted display and may be configured in a variety of ways. In one example, mount 120 may include a track 140 and a slide 130 that moves along track 140. In the example shown in FIG. 1, slide 130 may slide to the right along track 140. In other examples, slide 130 may be positioned within track 140. Furthermore, while FIG. 1 illustrates mount 120 as a tubular telescoping assembly, mount 120 may be configured in any other shape (e.g., squared or angular) using any other mechanical linkage mechanism (e.g., a rotary mechanism, a four-bar linkage mechanism, a slider-crank mechanism, a rotating cam mechanism, a geared mechanism, etc.). The term "telescoping assembly," as used herein, generally refers to a coupling of elements (e.g., concentric tubular parts) in which the elements are movably attached to each other in a manner that enables the telescoping assembly to shorten and lengthen.

Spring 110 may be coupled to mount 120 in a variety of ways. In one example, a rolled portion 112 of spring 110 may be coupled to mount 120 via a housing 150. In this example, housing 150 may contain one or more elements that facilitate adjusting spring 110. As shown in FIG. 1, housing 150 may include a drive gear 152. Drive gear 152 may represent any mating bevel gear that is dimensioned to be rotated by a user of strap-adjustment apparatus 100. For example, drive gear 152 may be designed to be rotated by a dial grip 154. In this example, dial grip 154 may encompass and/or be coupled to drive gear 152 in any manner such that rotation of dial grip 154 rotates drive gear 152. In some examples, drive gear 152 may be meshed with a driven gear 156. Driven gear 156 may represent any mating bevel gear that has an intersecting axis of rotation with drive gear 152. Specifically, driven gear 156 may be meshed with drive gear 152 such that rotation of drive gear 152 induces rotation of driven gear 156. In addition, driven gear 156 may be coupled to a shaft 158. Shaft 158 may be secured to the inside of driven gear 156 such that shaft 158 rotates with driven gear 156. Moreover, shaft 158 may be attached to rolled portion 112 of spring 110. In this configuration, rotation of shaft 158 may roll or unroll a protracted section 114 of spring 110.

In one example, protracted section 114 of spring 110 may be anchored to slide 130. As shown by the dotted lines within FIG. 1, protracted section 114 of spring 110 may be located under a slide cover 132 that covers slide 130 (and at least a portion of track 140). In one embodiment, the end of protracted section 114 may be held in place on slide 130 at a location 116. The end of protracted section 114 may be secured to slide 130 in a variety of ways, such as via a clamp, adhesive, post, and/or catch. Thus, protracted section 114 of spring 110 may be stationary relative to slide 130. Protracted section 114 of spring 110 may also be directly or indirectly anchored to slide 130 using any other suitable coupling mechanism.

In some embodiments, rotation of rolled portion 112 of spring 110 may cause protracted section 114 of spring 110 to extend or retract. In the event that rolled portion 112 is mounted to track 140 and protracted section 114 is anchored to slide 130, rotation of rolled portion 112 may cause slide 130 to move relative to track 140. As will be explained in greater detail below, movement of slide 130 may cause strap 160 to extend from or retract toward a head-mounted display coupled to strap 160, thereby adjusting the force the head-mounted display exerts against a user's face.

Rotating rolled portion 112 of spring 110 may also, in addition to or instead of causing protracted section 114 of spring 110 to extend or retract, cause a tension of spring 110 to change. For example, rotating rolled portion 112 of spring 110 may cause spring 110 to be wound more tightly, thereby increasing the tension of spring 110 and the force with which spring 110 pulls a head-mounted display against a user's face.

While the instant disclosure describes advantages and techniques for implementing a constant force spring within strap-adjustment apparatus 100, spring 110 may represent any additional or alternative type of spring (such as a compression spring, an extension spring, or a torsion spring). In general, spring 110 may represent any spring that may be coupled to both slide 130 and track 140 such that adjustment (e.g., changes in length and/or tension) of spring 110 adjusts the position of slide 130 relative to track 140. Furthermore, while the illustrated embodiments show examples of spring adjustments that involve rolling and unrolling a spring, an adjustment mechanism may adjust a spring by compressing it, extending it, loading it, and/or manipulating it in any other suitable manner.

Figure 2:
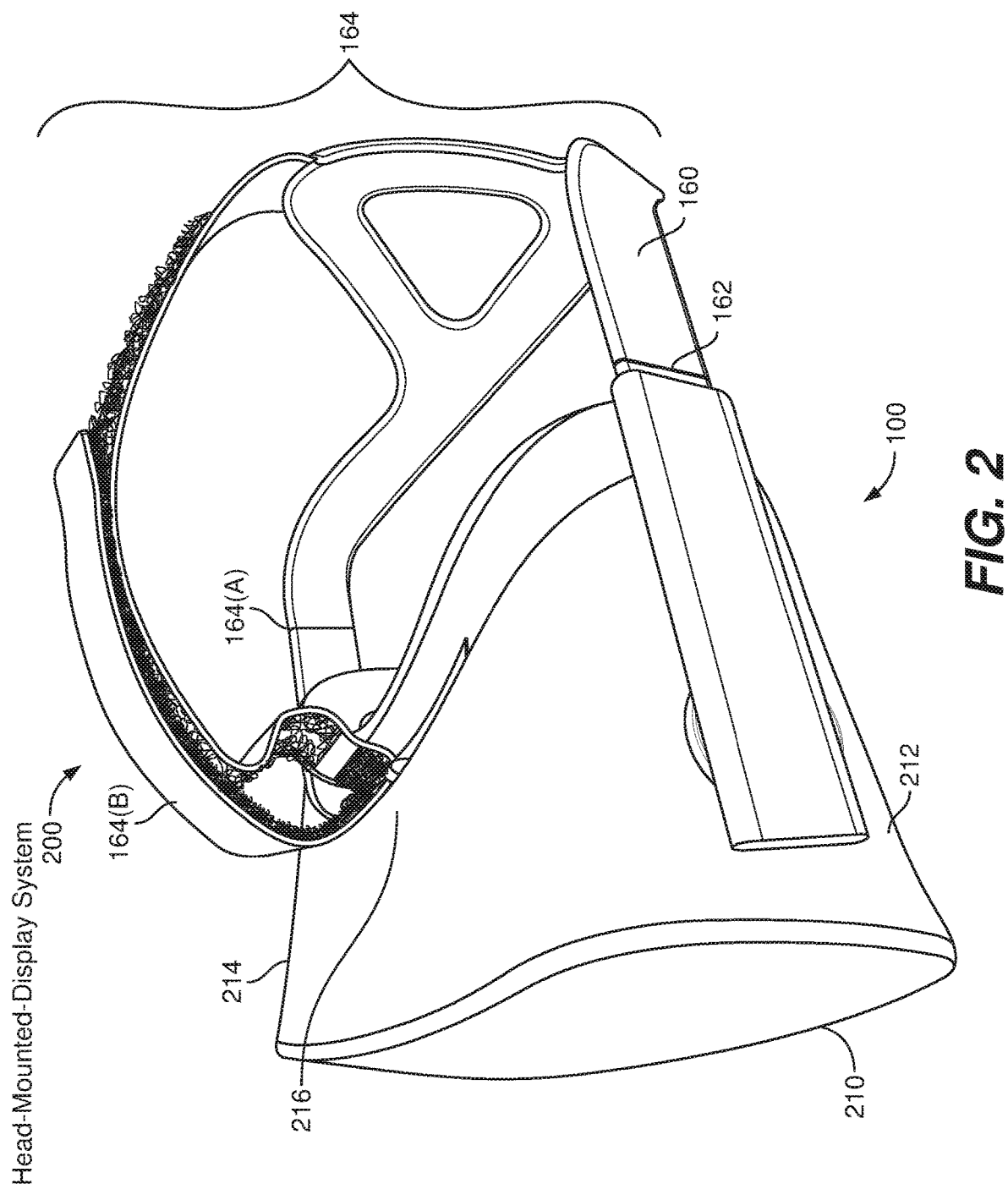
FIG. 2 is a perspective view of a system with a strap-adjustment apparatus coupled to a head-mounted display.

FIG. 2 is a perspective view of a head-mounted-display system 200 with strap-adjustment apparatus 100 coupled to a head-mounted display 210. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

As shown in FIGS. 1 and 2, a proximal section 162 of strap 160 may be coupled to spring 110. The term "strap," as used herein, generally refers to any strip of material (plastic, leather, cloth, woven, etc.) used to fasten, secure, or otherwise couple one object (e.g., a head-mounted display) to another (e.g., a user's head). The straps discussed in the present disclosure may be of any suitable shape, size, flexibility, or elasticity (e.g., stretchable or non-stretchable).

Strap 160 may be coupled to spring 110 either directly or indirectly. The example in FIG. 1 illustrates an indirect coupling of strap 160 to spring 110 with proximal section 162 of strap 160 attached to slide 130, and with spring 110 being housed within housing 150 (which is coupled to track 140). In other examples, strap 160 may be coupled to spring 110 by being formed or manufactured as an integral part of spring 110 or slide 130. Strap 160 may also be coupled to spring 110 in any other suitable manner.

Proximal section 162 of strap 160 may be coupled to a side portion 212 (e.g., a left-hand side) of head-mounted display 210. Similarly, a distal section 164 of strap 160 may also be attached to head-mounted display 210 as shown in FIG. 2 and discussed in greater detail in the disclosure corresponding to FIGS. 9-11. Distal section 164 of strap 160 may include a side section 164(A) coupled to a side portion 214 (e.g., a right-hand side) of head-mounted display 210. Distal section 164 of strap 160 may also include a top section 164(B) coupled to a top portion 216 of head-mounted display 210.

When putting on head-mounted-display system 200 or taking off head-mounted-display system 200 strap-adjustment apparatus 100 may enable a user to make micro adjustments for fitting head-mounted display 210 to the user's head. Micro adjustments may extend a strap within a range of approximately 1 mm (or less) to approximately 30 mm (or more) and may configure head-mounted-display system 200 to more comfortably fit on a user's head.

In addition to facilitating micro adjustments of head-mounted-display systems, embodiments of the instant disclosure may provide for macro adjustments of head-mounted-display systems. For example, head-mounted-display system 200 may include one or more additional strap-adjustment apparatuses that enable a user to make macro adjustments when fitting head-mounted display 210 to the user's head. While securing head-mounted display 210 for use, the user may first roughly adjust the fit of head-mounted display 210 using a macro-adjustment apparatus. The user may then fine-tune the pressure or fit of head-mounted display 210 using strap-adjustment apparatus 100. In general, a macro-adjustment apparatus may enable a larger range of strap-extension or strap-retraction than a micro-adjustment apparatus (e.g., up to 80 mm of adjustment).

As noted, strap-adjustment apparatus 100 may include a non-Hooke's-law spring. Non-Hooke's-law spring systems may provide one or more advantages over traditional adjustment devices when making micro adjustments to the fit of a head-mounted display. For example, a non-Hook's-law spring system may provide smooth, even resistance to strap extension as a user adjusts the head-mounted display against their face. In contrast, adjustment mechanisms that use traditional extension springs may become increasingly difficult or uncomfortable to adjust as a strap moves relative to a head-mounted display.

As another example of a potential advantage of strap-adjustment apparatus 100, a non-Hook's-law spring system may, regardless of the size or shape of a user's head pull a head-mounted display against the user's face with approximately the same force. Traditional spring fitting mechanisms, on the other hand, may exert more force on a user with a relatively large head (which may lead to discomfort) and less force on a user with a relatively small head (which may result in a loose fit).

Figure 3:
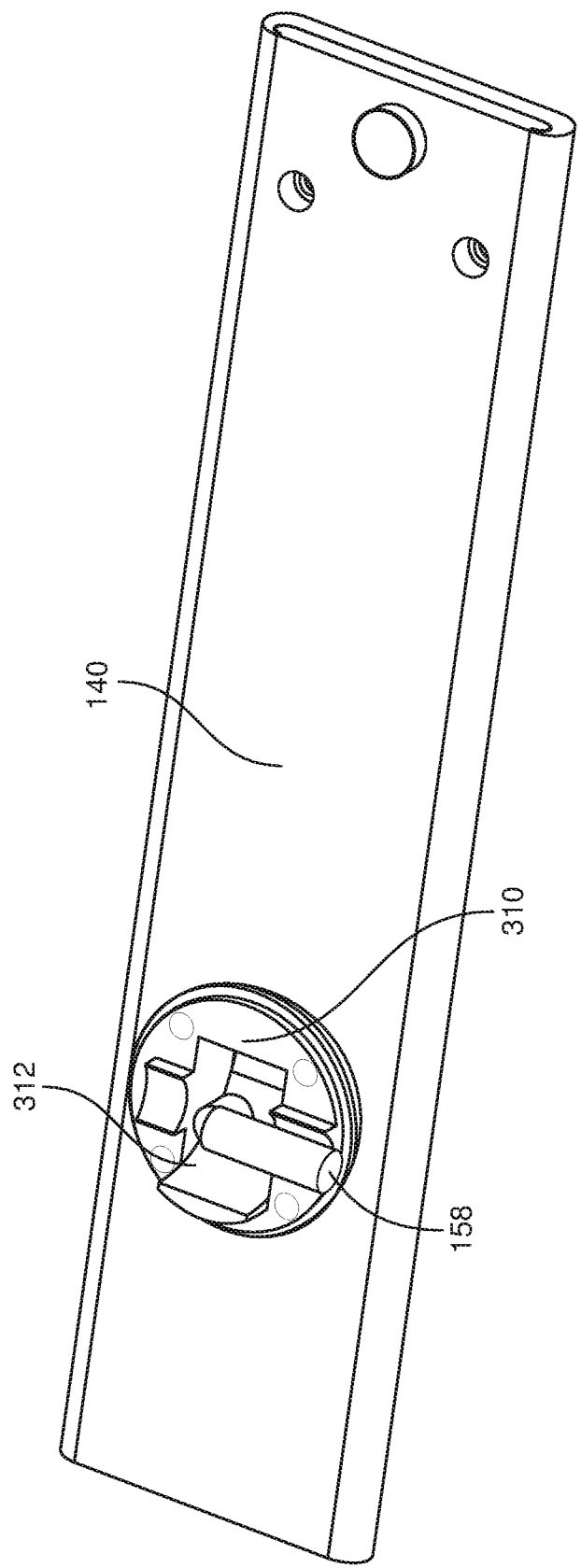
FIG. 3 is a perspective view of a movable slide within a strap-adjustment apparatus.
Figure 4:
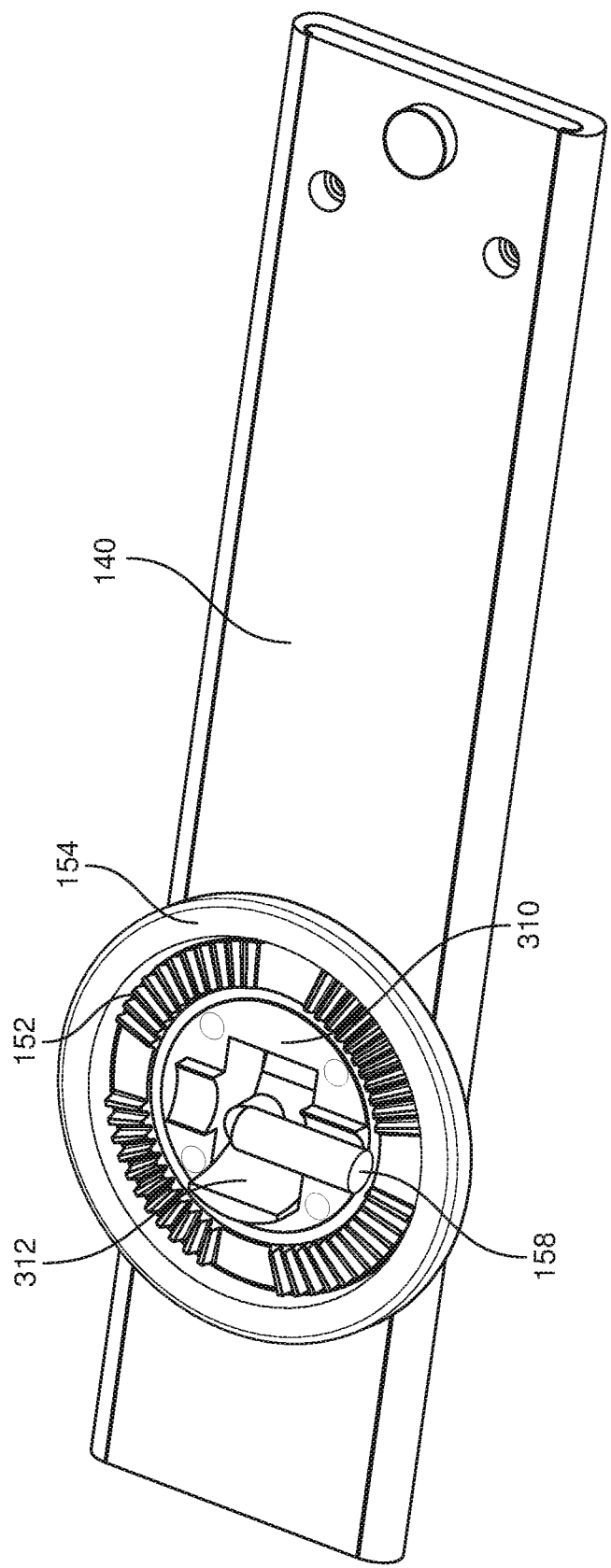
FIG. 4 is an additional view of the movable slide shown in FIG. 3.
Figure 5:
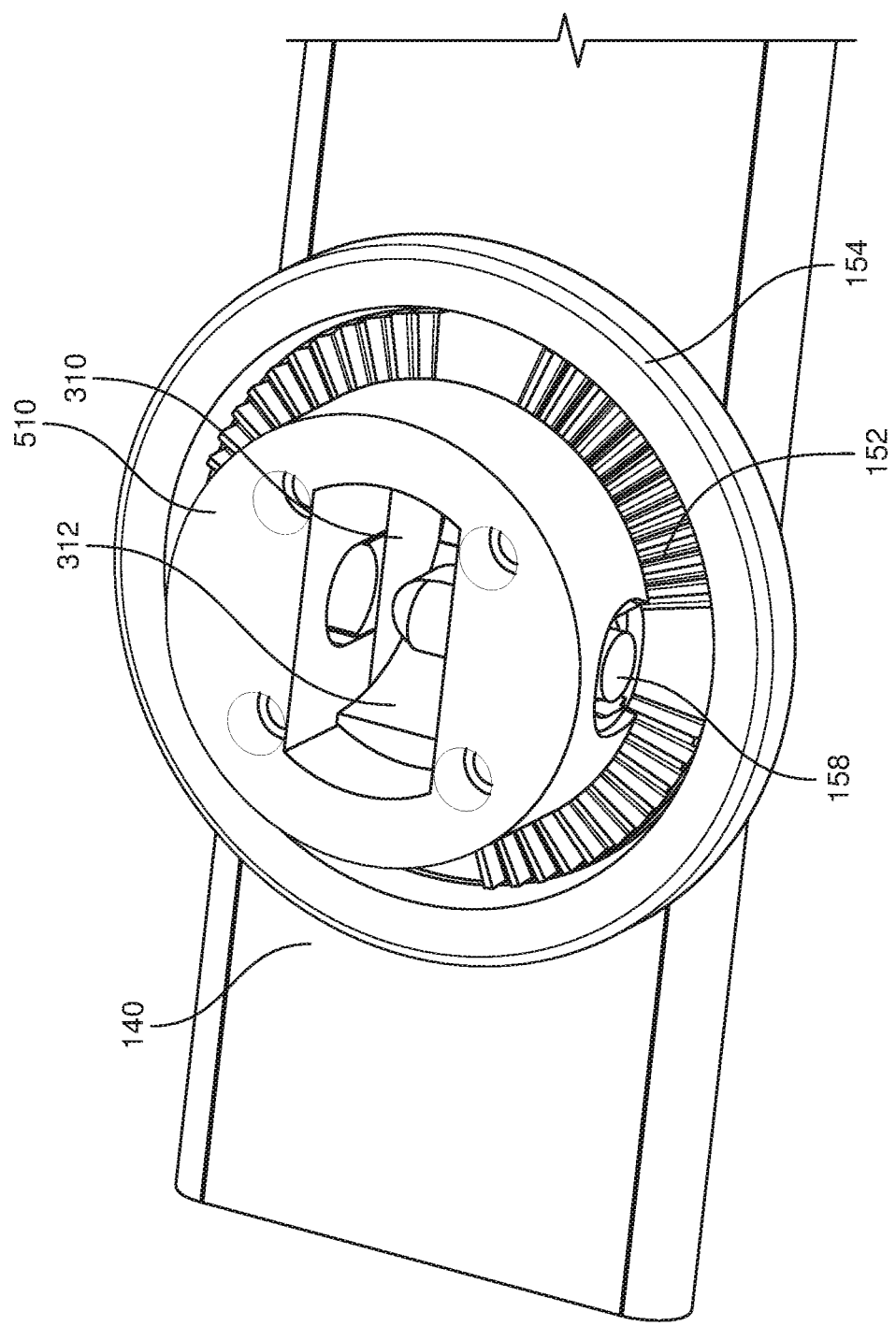
FIG. 5 is an additional view of the movable slide shown in FIGS. 3 and 4.

FIGS. 3-5 show various elements within housing 150 that may be coupled to track 140. While these figures may describe progressive layers or additions to track 140, components within housing 150 (and all additional components described herein) may be assembled, placed, and/or secured in any suitable manner or order.

FIG. 3 shows an example of shaft 158 mounted on track 140. In this example, shaft 158 may be secured to a spring support 312 that is attached to track 140. When rolled portion 112 of spring 110 is attached to shaft 158, spring 110 may rotate within spring support 312. In the event that the end of protracted section 114 of spring 110 is secured in a separate location (e.g., location 116 of slide 130), this rotation may cause protracted section 114 to extend or retract.

In one embodiment, spring support 312 may be positioned or placed within a gear mount 310. Gear mount 310 may be anchored to track 140 in any suitable way, such as via screws, clamps, or an adhesive. In addition, gear mount 310 may be dimensioned to support drive gear 152. For example, gear mount 310 may contain grooves or slots that enable rotation of drive gear 152 around gear mount 310.

FIG. 4 illustrates an example configuration of track 140 from FIG. 3 after drive gear 152 and dial grip 154 have been added to track 140. In this example drive gear 152 may be positioned around gear mount 310 such that drive gear 152 may rotate around gear mount 310. In addition, dial grip 154 may be secured to the outside of drive gear 152 such that drive gear 152 rotates with dial grip 154. As shown in FIG. 4, the diameter of dial grip 154 may exceed the width of track 140. In this way, dial grip 154 may extend past track 140, enabling a user to easily grasp and rotate dial grip 154. However, dial grip 154 (and drive gear 152) may have any suitable diameter or dimension.

FIG. 5 illustrates a close-up view of track 140 from FIG. 4 after a spring cover 510 has been added to track 140. In this example, spring cover 510 may be secured to gear mount 310 (e.g., directly over gear mount 310). In some embodiments, spring cover 510 may neither aid nor impede rotation of drive gear 152, dial grip 154, and/or spring 110. Instead, spring cover 510 may serve to protect spring 110 from damage, as well prevent injury to a user while rotating dial grip 154.

Figure 6:
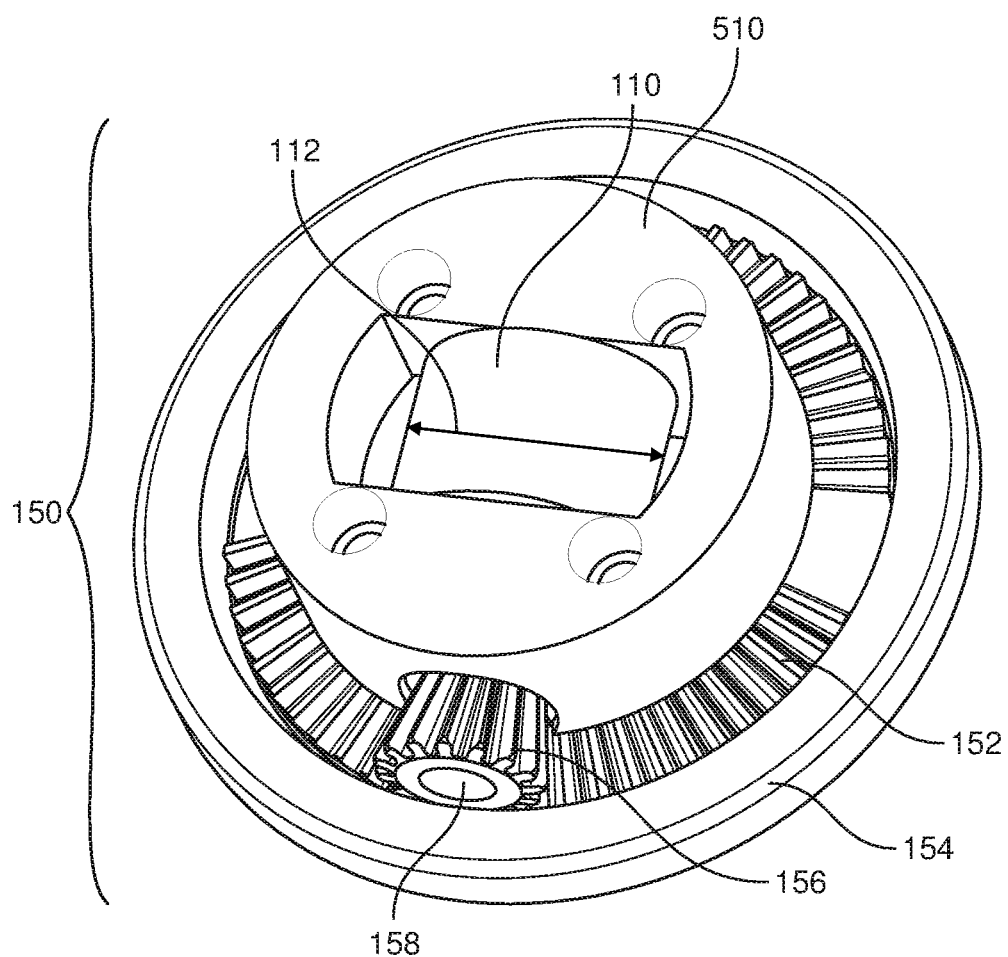
FIG. 6 is a close-up view of a housing that facilitates adjusting a constant force spring.

FIG. 6 illustrates all visible components of housing 150 after housing 150 has been fully assembled. In particular, this example illustrates the configuration of housing 150 after rolled portion 112 of spring 110 and driven gear 156 have been coupled to shaft 158 within FIG. 5. As shown in FIG. 6, drive gear 152 and driven gear 156 may have intersecting axes of rotation. Thus, driven gear 156 may rotate in response to rotation of drive gear 152 and/or dial grip 154. Rotation of driven gear 156 may in turn cause rotation of shaft 158, which may adjust the tension of spring 110.

Figure 7:
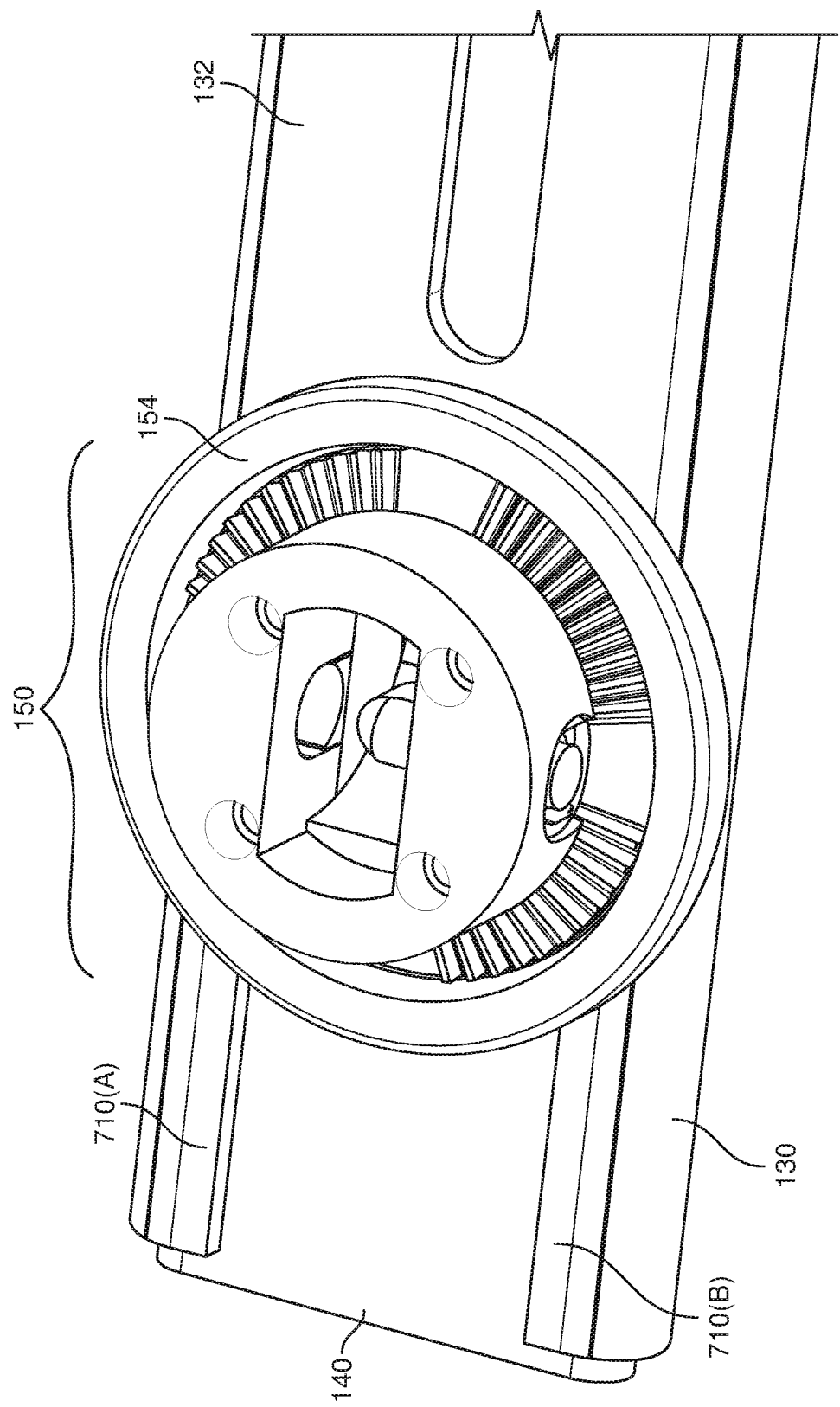
FIG. 7 is a close-up view of a movable slide positioned within a base track of a strap-adjustment apparatus.

FIG. 7 illustrates an example configuration of track 140 positioned within slide 130. As shown in FIG. 7, slide 130 may include a lip 710(A) and a lip 710(B) that secure slide 130 around track 140. In this way, slide 130 may move left and right with respect to the orientation of track 140 in FIG. 7, but may not become disengaged from track 140. FIG. 7 also shows that dial grip 154 may be at least partially supported by lips 710(A-B). As lips 710(A-B) may slide back and forth underneath dial grip 154 with movement of slide 130, housing 150 may be mounted in a manner that reduces excessive friction between dial grip 154 and lips 710(A-B).

Figure 8:
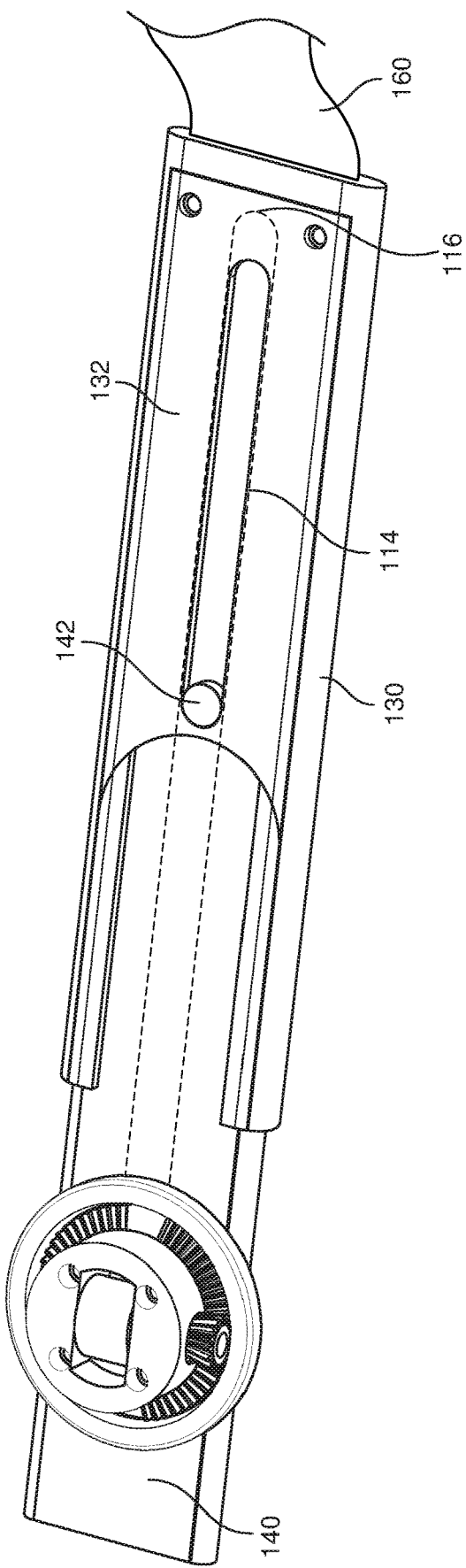
FIG. 8 is an additional view of a movable slide positioned within a base track of a strap-adjustment apparatus.

FIG. 8 shows an example of slide 130 and track 140 when slide 130 has been fully extended along track 140. As shown in FIGS. 1 and 8, protracted section 114 of spring 110 may be anchored to slide 130 at location 116. As rolled portion 112 of spring 110 unrolls, the length of protracted section 114 may increase. In addition, the tension of spring 110 may decrease. The lengthening of protracted section 114 may cause slide 130 to extend along track 140, which may cause strap 160 to move away from a head-mounted display to which strap 160 is coupled. If strap 160 is positioned such that the head-mounted display is in contact with a user's face, extension of slide 130 may decrease the force that the head-mounted display exerts on the user's face. In other words, decreasing the tension of spring 110 may decrease the force that a head-mounted display containing strap-adjustment apparatus 100 exerts on a user's face.

A user may retract slide 130 along track 140 by rotating dial grip 154 in a direction opposite to that used to extend slide 130. For example, if clockwise rotation of dial grip 154 increases the length of protracted section 114, counter-clockwise rotation of dial grip 154 may decrease the length of protracted section 114. The shortening of protracted section 114 may cause slide 130 to retract along track 140, which may cause strap 160 to retract toward a head-mounted display to which strap 160 is coupled. If strap 160 is positioned such that the head-mounted display is in contact with a user's face, retraction of slide 130 may increase the force that the head-mounted display exerts on the user's face.

In one example, the movement of slide 130 may be limited or controlled by a post 142. Post 142 may be secured to track 140 and may be dimensioned to fit within a slot of slide cover 132. When post 142 is at the end of the slot closest to location 116 (as shown in FIG. 1), slide 130 may be fully retracted (i.e., post 142 may prevent further retraction of slide 130). When post 142 is at the other end of the slot, slide 130 may be fully extended.

Figure 9:
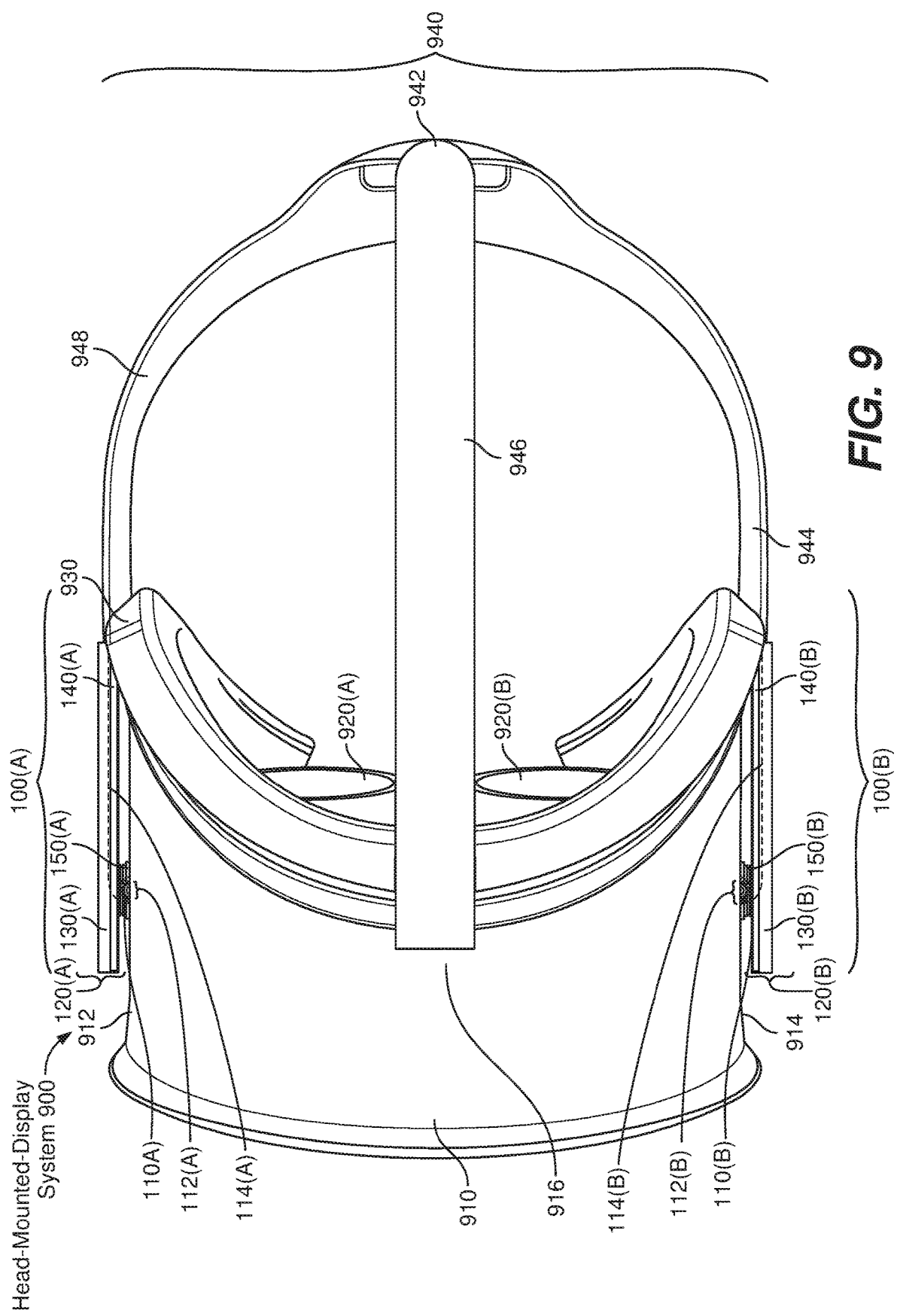
FIG. 9 is a top view of multiple strap-adjustment devices coupled to a head-mounted display.
Figure 10:
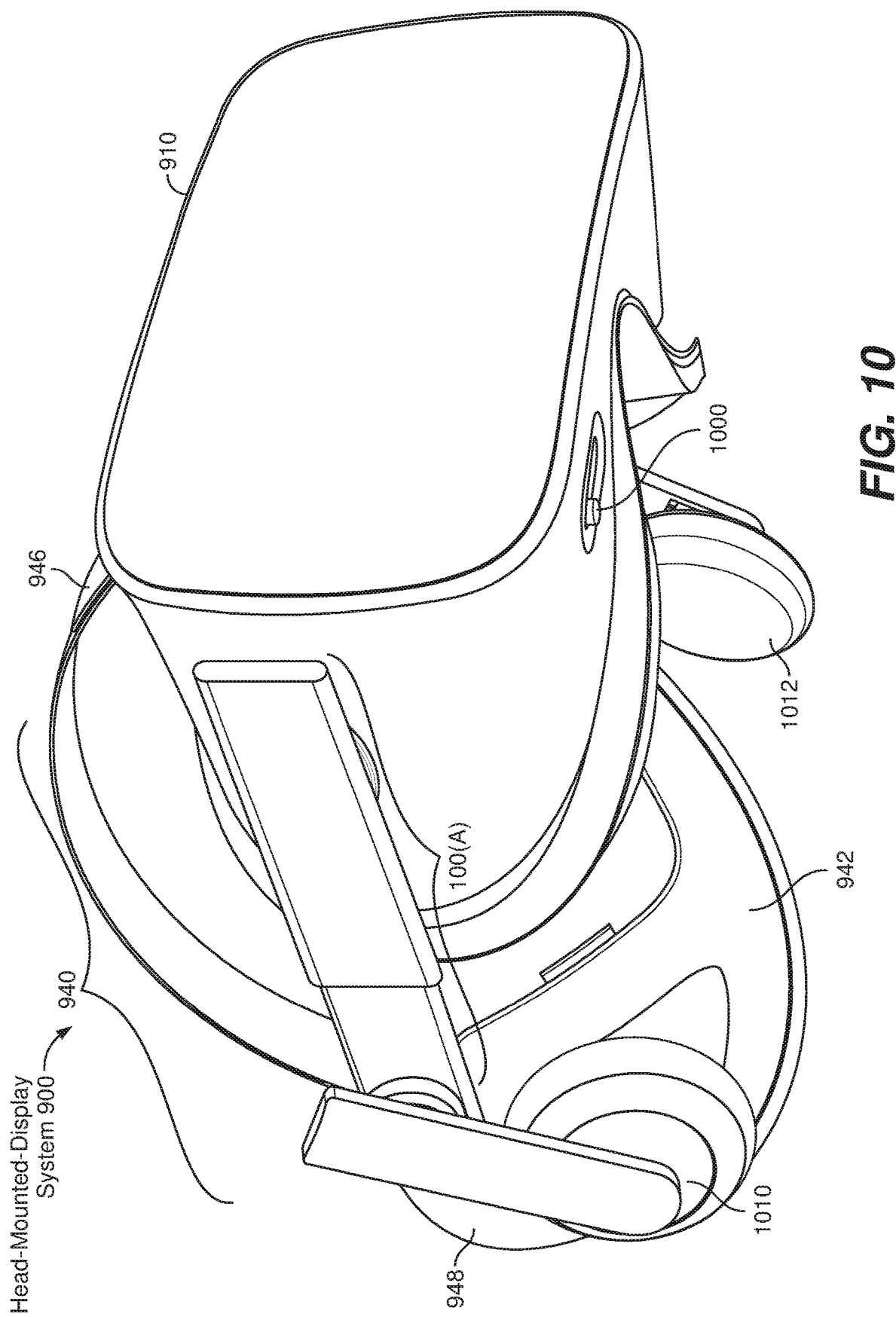
FIG. 10 is a perspective view of a head-mounted display with audio components that are coupled to strap-adjustment devices.
Figure 11:
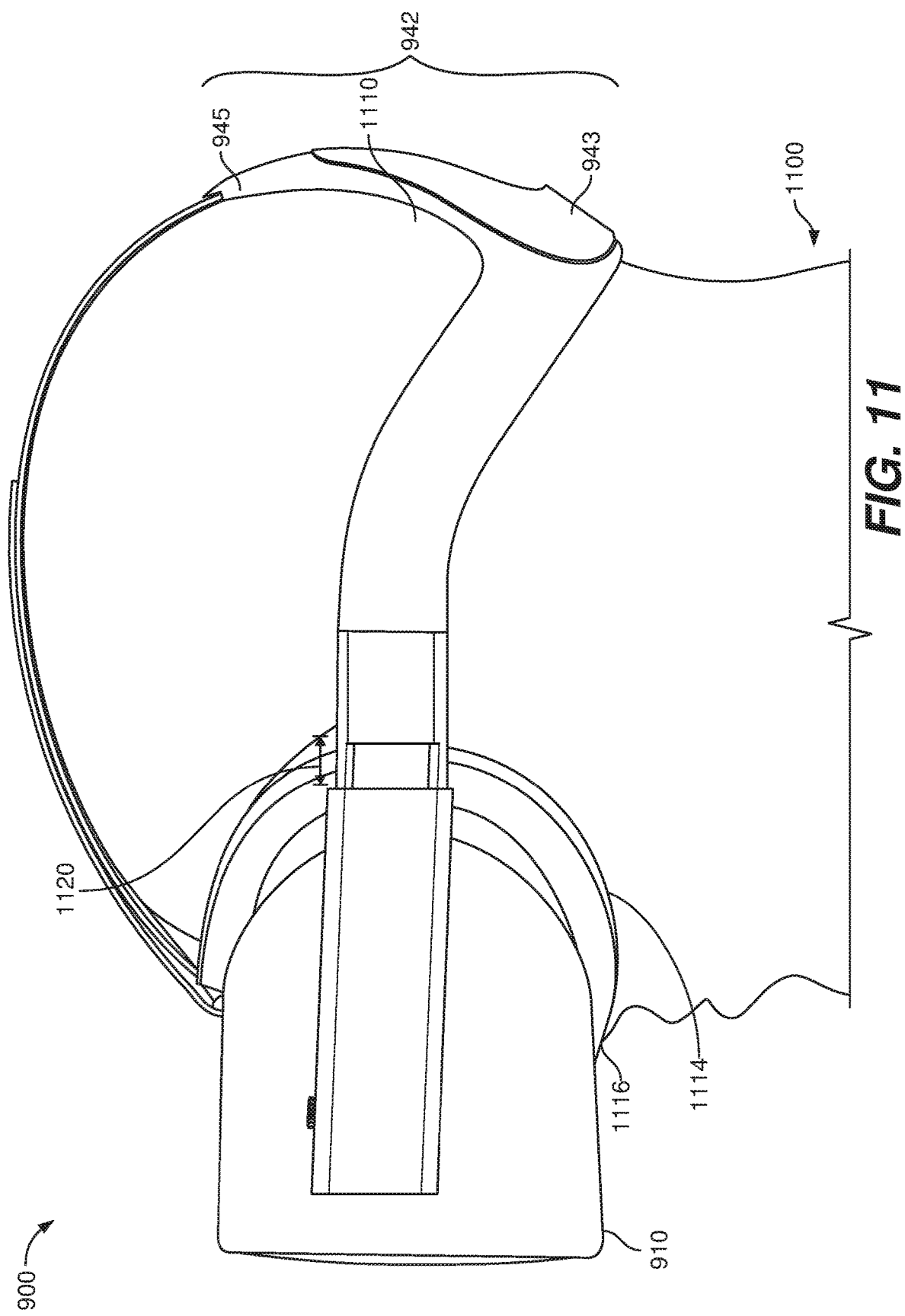
FIG. 11 is a side view of a head-mounted-display system positioned on a user's head.

The strap-adjustment devices shown in FIGS. 3-8 may be part of a head-mounted-display system, as shown in FIGS. 9-11. FIG. 9 is a top view of head-mounted-display system 900 that includes two instances of strap-adjustment apparatus 100, which are referenced in FIG. 9 as 100(A) and 100(B). As shown in FIG. 9, strap-adjustment apparatus 100(A) may be mounted on a right side 912 of a head-mounted display 910 in a location that positions strap-adjustment apparatus 100(A) near a user's right temple when the user wears head-mounted-display 910. Similarly, strap-adjustment apparatus 100(B) may be mounted on a left side 914 of head-mounted-display 910 in a location that positions strap-adjustment apparatus 100(B) near a user's left temple when the user wears head-mounted display 910.

Mounting an instance of strap-adjustment apparatus 100 on each side of head-mounted display 910 may improve the comfort and fit of head-mounted-display 910 against a user's face. For example, adjusting both apparatus 100(A) on right side 912 and apparatus 100(B) on left side 914 may enable right side 912 and left side 914 to be secured against a user's face with equal force. To facilitate adjustments to both sides of head-mounted display 910, apparatus 100(A) may be configured for right-handed use, while apparatus 100(B) may be configured for left-handed use. In these examples, the components of apparatus 100(A) and apparatus 100(B) may be the same or similar, but may be mounted in mirror images of one another. For example, while apparatus 100(A) may be configured such that clockwise rotation of a dial gear within apparatus 100(A) increases the force of right side 912 against a user's face, apparatus 100(B) may be configured such that counter-clockwise rotation of a dial gear increases the force of left side 914 against the user's face. In one embodiment, driven and drive gears within apparatus 100 (A) and apparatus 100(B) may have teeth cut with both right-handed and left-handed threads (i.e., both clockwise and counter-clockwise threads). Thus identical gears may be used in both apparatuses, eliminating the need to manufacture separate components.

FIGS. 9 and 10 also show various additional elements that may be included in head-mounted-display system 900. For example, head-mounted display 910 may include display optics 920(A-B) and a facial-interface system 930 (e.g., a cushion). Head-mounted display 910 may also be coupled to a strap system 940, which may include a back section 942 that forms a coupling point for a left-side section 944, a top section 946, and a right-side section 948. Left-side section 944 of strap system 940 may be coupled to strap-adjustment apparatus 100(B), right-side section 948 may be coupled to strap-adjustment apparatus 100(A), and top section 946 may be coupled to a top portion or area 916 of head-mounted display 910. Furthermore, as show in FIG. 10 (a perspective view of head-mounted-display system 900), head-mounted display 910 may include a slider 1000 that may adjust a position and/or focus of display optics 920(A) and 920(B). Also, as shown in FIG. 10, head-mounted-display system 900 may include an audio system with headphones 1010 and 1012 that are coupled to strap-adjustment apparatus 100(A) and 100(B), respectively, FIG. 11 shows an example of how a user may wear and adjust head-mounted-display system 900. By making micro-adjustments to the fit of head-mounted-display system 900, a user may extend strap-adjustment apparatus 100(B) by a travel distance 1120, as shown in FIG. 11. While the user is wearing head-mounted-display system 900, back section 942 of strap system 940 may include a lower region 943 that conforms to a region of user's head 1100 below the user's occipital lobe 1110 (i.e., below the user's occipital protuberance). In some embodiments, back section 942 of strap system 940 may include an upper region 945 that conforms to an upper-back region of user's head 1100 above occipital lobe 1110. Upper region 945 of back section 942 may coordinate with one or more other sections of strap system 940 to balance and stabilize head-mounted display 910 on user's head 1100. Additionally, strap system 940 may allow minimum or no weight bearing on a user's cheek 1114 or nose 1116 when head-mounted display 910 is on user's head 1100. Therefore, unlike the straps for ski goggles, which may rely on friction between the straps and the user's head and the friction between the goggles and the user's face to hold and balance the weight of the goggles, the flexible strap systems discussed in the present disclosure provide a much-improved user experience.

In examples where spring 110 is a constant-force spring, the force applied by spring 110(B) may be similar when strap-adjustment apparatus 100(B) is extended by a relatively short distance as when strap-adjustment apparatus 100(B) is extended by a relatively long distance. For example, the force applied by spring 110(B) may be the same whether travel distance 1120 is 2 mm or travel distance 1120 is 20 mm.

Figure 12:
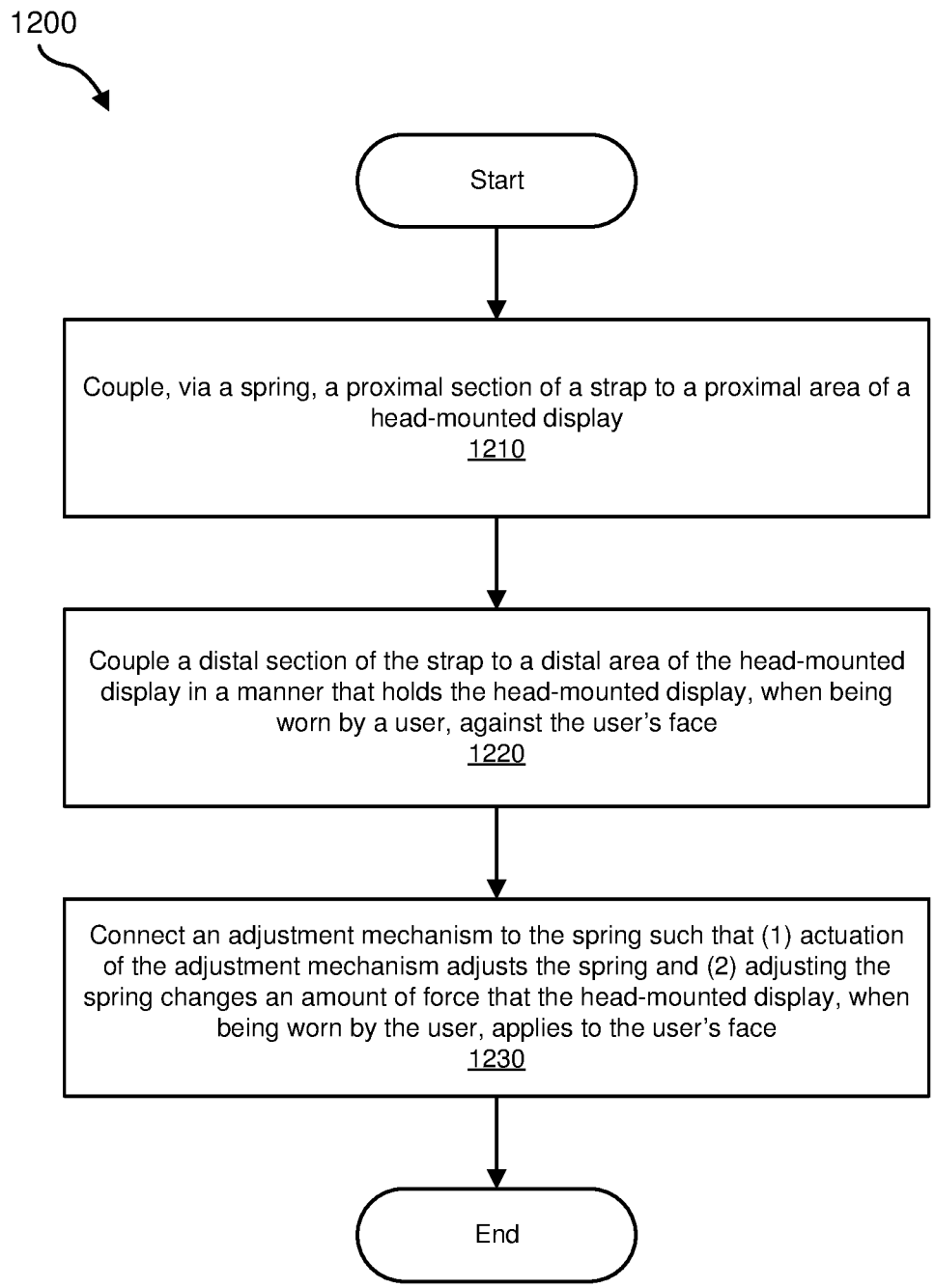
FIG. 12 is a flow diagram of a method for assembling a strap-adjustment apparatus with a constant force spring.
Figure 13:
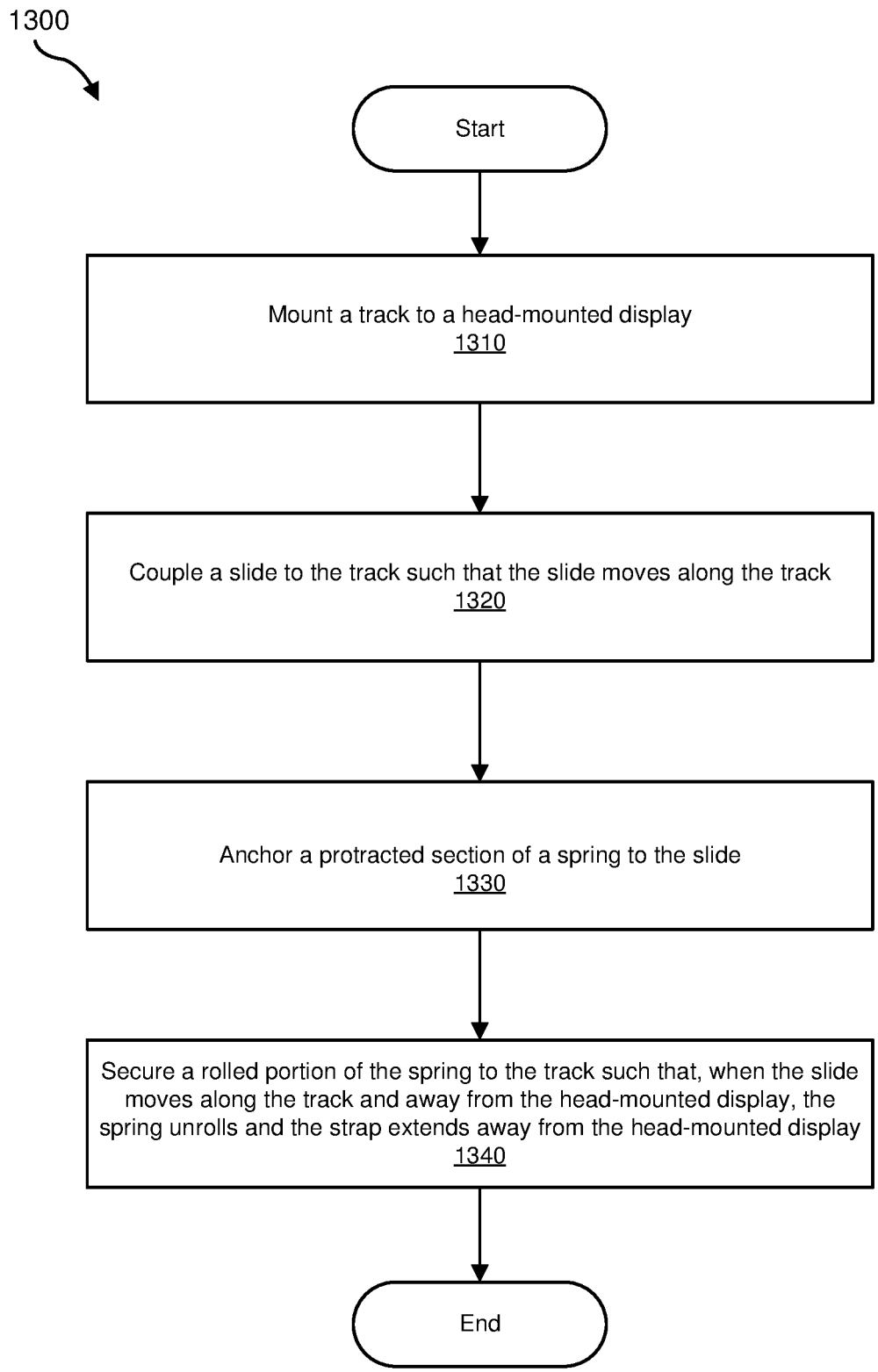
FIG. 13 is a flow diagram of a method for coupling a ribbon spring to a head-mounted display.

FIGS. 12 and 13 show exemplary methods for manufacturing, assembling, using, adjusting, or otherwise configuring or creating the systems and devices presented herein. FIG. 12 is a flow diagram of an exemplary method 1200 for assembling a strap-adjustment apparatus per embodiments disclosed herein and FIG. 13 is a flow diagram of an exemplary method 1300 for securing a strap-adjustment apparatus to a head-mounted display. The steps shown in FIGS. 12 and 13 may be performed by any individual and/or by any suitable type or form of manual and/or automated apparatus.

As shown in FIG. 12, at step 1210 a proximal section of a strap may be coupled, via a spring, to a proximal area of a head-mounted display. For example, as shown in FIG. 9, a proximal section of strap system 940 (e.g., right-side section 948) may be coupled to a proximal side of head-mounted display 910 (e.g., right side 912) via spring 110(A). This coupling may be either a direct or indirect connection (e.g., via strap-adjustment apparatus 100(A)). In one embodiment, spring 110(A) may be secured to mount 120 (A), which may be coupled to both right side 912 and right-side section 948.

At step 1220, a distal section of the strap may be coupled to a distal area of the head-mounted display in a manner that holds the head-mounted display, when being worn by a user, against the user's face. For example, a distal section of strap system 940 (e.g., left-side section 944) may be coupled to a distal area of head-mounted display 910 (e.g., left side 914), via either a direct or indirect connection. In one embodiment, the distal section of strap system 940 may be coupled to the distal area of head-mounted display 910 via apparatus 100(B). For example, spring 110(B) may be secured to mount 120(B), which may be coupled to both left side 914 and left-side section 944.

At step 1230, an adjustment mechanism may be connected to the spring such that (1) actuation of the adjustment mechanism adjusts the spring and (2) adjusting the spring changes an amount of force that the head-mounted display, when being worn by the user, applies to the user's face. For example, rolled portion 112(A) of spring 110(A) may be secured within housing 150(A), which may be attached to track 140(A) within mount 120(A). Housing 150(A) may contain one or more elements (such as drive gear 152, dial grip 154, driven gear 156, and shaft 158) that enable spring 110(A) to be adjusted. In addition, protracted section 114(B) of spring 110(A) may be anchored to slide 130(A) within mount 120(A). In this configuration, adjusting spring 110(A) (e.g., rolling or unrolling rolled portion 112(A), may adjust the force that right side 912 of head-mounted display 910 exerts on a user's face while the user wears head-mounted display 910. For example unrolling the spring (which may decrease the tension of spring 110(A)) may cause slide 130(A) to extend along track 140(A) (i.e., towards the back of the user's head), which may reduce the force that right side 912 exerts on the user's face. Conversely, retracting the spring (which may increase the tension of spring 110(A)) may cause slide 130(A) to retract along track 140(A), which may increase the force that right side 912 exerts on the user's face.

Turning to FIG. 13, exemplary method 1300 may include steps for securing a spring to a head-mounted display. At step 1310, a track may be mounted to a head-mounted display. For example, as shown in FIG. 9, track 140(A) may be mounted to right side 912 of head-mounted display 910. Track 140(A) may be mounted to head-mounted display 910 with a movable attachment mechanism such a swivel, a hinge, a ball and socket, and/or any other type or form of pivoting or rotating attachment. Alternatively, track 140(A) may be mounted to head-mounted display 910 via a fixed coupling mechanism. For example, track 140(A) may be formed as an integral part of head-mounted display 910 and/or may be attached with a non-movable attachment mechanism (e.g., a fastener, an adhesive, etc.).

At step 1320, a slide may be coupled to the track such that the slide moves along the track. For example, as shown in FIG. 9, slide 130(A) may be movably coupled to track 140(A). Slide 130(A) may be coupled to track 140(A) in any suitable manner. For example, track 140(A) may be inserted into slide 130(A), and track 140(A) may include a catch that prevents slide 130(A) from decoupling from track 140(A). In some embodiments, the catch may be configured to allow slide 130(A), along with strap system 940, to be detached from track 140(A). A user may detach strap system 940 from track 140(A) to decouple strap system 940 from head-mounted display 910 (e.g., to allow easier cleaning of strap system 940 or head-mounted display 910, to allow strap system 940 to be swapped with a different strap system, etc.).

At step 1330, a protracted section of a spring may be anchored to the slide. For example, as shown in FIG. 9, protracted section 114(A) of spring 110(A) may be anchored to slide 130(A). Protracted section 114(A) may be anchored to slide 130(A) in any suitable manner. In some embodiments, protracted section 114(A) of spring 110(A) may be anchored to slide 130(A) via a catch or post in slide 130(A). Additionally or alternatively, protracted section 114(A) of spring 110(A) may be anchored to slide 130(A) via a fastener and/or an adhesive.

At step 1340, a rolled portion of the spring may be secured to the track such that, when the slide moves along the track and away from the head-mounted display, the spring unrolls and the strap extends away from the head-mounted display. For example, rolled portion 112(A) of spring 110(A) may be positioned inside housing 150(A) of track 140(A). Thus, when a user adjusts the tension of spring 110(A) (e.g., via an adjustment mechanism within housing 150(A)), spring 110(A) may extend (e.g., unroll) or retract (e.g., roll up), thereby adjusting the fit (e.g., pressure) of head-mounted display 910 against the user's face.

While the steps of FIG. 13 have been discussed using an example of how spring 110(A) may be coupled to head-mounted display 910, the steps discussed in FIG. 13 may also be implemented to couple spring 110(B) to head-mounted display 910.

The process parameters and sequence of the steps described and/or illustrated in FIGS. 12 and 13 are given by way of example only and can be varied as desired. For example, while the steps illustrated and/or described herein may be shown or discussed in a particular order these steps do not necessarily need to be performed in the order illustrated or discussed to assemble, manufacture, or use strap-adjustment apparatus 100. The various exemplary methods described and/or illustrated in FIGS. 12 and 13 may also omit one or more of the steps described or illustrated herein or include additional steps in addition to those disclosed.

As discussed throughout the instant disclosure, the disclosed methods, systems, and devices may provide one or more advantages over traditional headset fitting mechanisms. For example, the strap-adjustment devices described herein may provide increased strap adjustment ranges relative to other types of adjustment systems. As a result, these strap-adjustment devices may comfortably accommodate a wider range of head sizes than other systems. As another example, by using constant-force springs to enable strap extension, the systems described herein may eliminate some (or all) of the manual adjustments that may have been needed to properly fit a traditional head-mounted display. Thus, switching a headset between multiple users may be much less cumbersome and time-consuming. Furthermore, by enabling a user to make micro adjustments while using a head-mounted display, the devices discussed herein may allow the user to stay immersed in a virtual- or augmented-reality experience without discomfort or distraction. In general, the systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display adjustment apparatus comprising:
   a strap comprising:
      a proximal section coupled to a proximal area of a head-mounted display, and
      a distal section coupled to a distal area of the head-mounted display in a manner that holds the head-mounted display, when being worn by a user, against the user's face;
   a spring that couples the proximal section of the strap to the proximal area of the head-mounted display;
   an adjustment mechanism connected to the spring such that:
      actuation of the adjustment mechanism adjusts tension of the spring; and
      adjusting the tension of the spring changes an amount of force that the head-mounted display, when being worn by the user, applies to the user's face; and
   a housing that couples the spring to the head-mounted display, wherein:
      the housing comprises a drive gear dimensioned to be rotated by the user of the head-mounted display;
      the adjustment mechanism comprises a driven gear meshed with the drive gear such that rotation of the drive gear turns the driven gear; and
      the driven gear is coupled to the spring such that rotation of the driven gear adjusts the tension of the spring.

2. The head-mounted-display adjustment apparatus of claim 1, wherein the adjustment mechanism comprises a shaft coupled to the spring such that rotation of the shaft adjusts the tension of the spring.

3. The head-mounted-display adjustment apparatus of claim 2, wherein:
   rolling the spring increases the amount of force that the head-mounted display, while being worn by the user, applies to the user's face; and
   unrolling the spring decreases the amount of force that the head-mounted display, when being worn by the user, applies to the user's face.

4. The head-mounted-display adjustment apparatus of claim 3, wherein the spring comprises a constant force spring having:
   an outside portion coupled to the strap; and
   an inside portion coupled to the shaft.

5. The head-mounted-display adjustment apparatus of claim 4, further comprising:
   a base track coupled to the head-mounted display; and
   a movable slide that is positioned around the base track, wherein the outside portion of the constant force spring is anchored to the movable slide.

6. The head-mounted-display adjustment apparatus of claim 5, wherein:
   the constant force spring comprises a ribbon having a rolled portion and a protracted section that extends from the rolled portion and is anchored to the movable slide; and
   rotation of the driven gear rolls or unrolls the ribbon to adjust the tension of the spring.

7. The head-mounted-display adjustment apparatus of claim 1, wherein the driven and drive gears:
   comprise mating bevel gears;
   have intersecting axes of rotation; and
   comprise conical tooth-bearing faces with adjacent pitch cones.

8. The head-mounted-display adjustment apparatus of claim 1, wherein:
   the drive gear comprises a rotatable outer dial grip; and
   the housing of the spring also holds the driven gear and is fixed to a base upon which the drive gear rotates.

9. The head-mounted-display adjustment apparatus of claim 1, wherein:
   the housing that couples the spring to the proximal area of the head-mounted display is configured for right-handed use; and
   an additional housing couples an additional spring to the distal area of the head-mounted display in a mirror image of the housing that couples the spring to the proximal area such that the additional housing is configured for left-handed use.

10. The head-mounted-display adjustment apparatus of claim 9, wherein the driven and drive gears that are within the housing that is configured for right-handed use:
   have teeth cut with both right-handed and left-handed threads; and
   are identical to driven and drive gears within the additional housing configured for left-handed use.

11. A head-mounted-display system comprising:
   a head-mounted display;
   a strap comprising:
      a proximal section coupled to a proximal area of the head-mounted display, and
      a distal section coupled to a distal area of the head-mounted display in a manner that holds the head-mounted display, when being worn by a user, against the user's face;
   a spring that couples the proximal section of the strap to the proximal area of the head-mounted display;
   an adjustment mechanism connected to the spring such that:
      actuation of the adjustment mechanism adjusts tension of the spring; and
      adjusting the tension of the spring changes an amount of force that the head-mounted display, when being worn by the user, applies to the user's face; and
   a housing that couples the spring to the head-mounted display, wherein:
      the housing comprises a drive gear dimensioned to be rotated by the user of the head-mounted display;
      the adjustment mechanism comprises a driven gear meshed with the drive gear such that rotation of the drive gear turns the driven gear; and
      the driven gear is coupled to the spring such that rotation of the driven gear adjusts the tension of the spring.

12. The head-mounted-display system of claim 11, wherein:
   adjusting the tension of the spring comprises at least one of rolling or unrolling the spring;
   rolling the spring increases the amount of force that the head-mounted display applies to the user's face; and
   unrolling the spring decreases the amount of force that the head-mounted display applies to the user's face.

13. The head-mounted-display system of claim 11, wherein the adjustment mechanism comprises a shaft coupled to the spring such that rotation of the shaft adjusts the tension of the spring.

14. The head-mounted-display system of claim 11, wherein the spring is a constant force spring comprising a ribbon having a rolled portion and a protracted section that extends from the rolled portion.

15. The head-mounted-display system of claim 14, wherein:
  the rolled portion of the constant force spring is attached to a base track that is located inside a movable slide and is attached to the head-mounted display;
  the protracted section of the constant force spring is anchored to the movable slide;
  unrolling the spring causes the movable slide to extend along the base track and the strap to extend away from the head-mounted display; and
  rolling the spring causes the movable slide to retract along the base track and the strap to retract toward the head-mounted display.

16. The head-mounted-display system of claim 14, wherein:
  rolling the spring increases the amount of force that the head-mounted display, while being worn by the user, applies to the user's face; and
  unrolling the spring decreases the amount of force that the head-mounted display, when being worn by the user, applies to the user's face.

17. The head-mounted-display system of claim 11, further comprising
  an additional housing that couples an additional spring to the distal area of the head-mounted display and is configured for left-handed use.

18. A method comprising:
  coupling, via a spring, a proximal section of a strap to a proximal area of a head-mounted display;
  coupling a distal section of the strap to a distal area of the head-mounted display in a manner that holds the head-mounted display, when being worn by a user, against the user's face;
  connecting an adjustment mechanism to the spring such that:
    actuation of the adjustment mechanism adjusts tension of the spring; and
    adjusting the tension of the spring changes an amount of force that the head-mounted display, when being worn by the user, applies to the user's face; and
  coupling the spring to the head-mounted display via a housing, wherein:
    the housing comprises a drive gear dimensioned to be rotated by the user of the head-mounted display;
    the adjustment mechanism comprises a driven gear meshed with the drive gear such that rotation of the drive gear turns the driven gear; and
    the driven gear is coupled to the spring such that rotation of the driven gear adjusts the tension of the spring.

19. The method of claim 18, wherein connecting the adjustment mechanism to the spring comprises coupling the spring to the driven gear via a shaft such that rotation of the shaft adjusts the tension of the spring.

20. The method of claim 19, wherein coupling the spring to the driven gear via the shaft comprises:
  coupling a coiled section of the spring to the shaft and an extended section the spring to the strap; and
  coupling the shaft with the driven gear such that rotation of the driven gear rotates the shaft.

\* \* \* \* \*

UNITED STATES PATENT AND TRADEMARK OFFICE
CERTIFICATE OF CORRECTION

PATENT NO. : 10,747,005 B1  
APPLICATION NO. : 15/615775  
DATED : August 18, 2020  
INVENTOR(S) : Joseph Patrick Sullivan Page 1 of 1

It is certified that error appears in the above-identified patent and that said Letters Patent is hereby corrected as shown below:

In the Claims

In Column 15, Line 15, Claim 1, delete "display," and insert -- display; --, therefor.

In Column 16, Line 36, Claim 11, delete "display," and insert -- display; --, therefor.

Signed and Sealed this  
Thirteenth Day of October, 2020

Andrei Iancu  
*Director of the United States Patent and Trademark Office*